United States Patent
Wilt et al.

(10) Patent No.: US 6,954,214 B2
(45) Date of Patent: Oct. 11, 2005

(54) EFFICIENT PERCEPTUAL/PHYSICAL COLOR SPACE CONVERSION

(75) Inventors: Nicholas P. Wilt, Seattle, WA (US); Gideon A. Yuval, Mercer Island, WA (US); Michael D. Stokes, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 463 days.

(21) Appl. No.: 09/780,325

(22) Filed: Feb. 9, 2001

(65) Prior Publication Data

US 2002/0085015 A1 Jul. 4, 2002

Related U.S. Application Data

(63) Continuation-in-part of application No. 09/702,146, filed on Oct. 30, 2000, now abandoned.

(51) Int. Cl.$^7$ .............................. G09G 5/02; G09G 5/00
(52) U.S. Cl. ...................... 345/591; 345/589; 345/600; 345/604; 345/643
(58) Field of Search ................................ 345/589, 591, 345/600, 604, 643

(56) References Cited

U.S. PATENT DOCUMENTS

| | | | | |
|---|---|---|---|---|
| 4,916,531 A | * | 4/1990 | Genz et al. ................ | 708/653 |
| 5,206,823 A | * | 4/1993 | Hesson ...................... | 708/654 |
| 5,926,406 A | * | 7/1999 | Tucker et al. .............. | 708/606 |
| 6,320,592 B1 | * | 11/2001 | Evans et al. ............... | 345/600 |
| 6,351,760 B1 | * | 2/2002 | Shankar et al. ............ | 708/654 |
| 6,462,748 B1 | * | 10/2002 | Fushiki et al. ............. | 345/604 |

OTHER PUBLICATIONS

*IEEE Standard for Binary Floating–Point Arithmetic*, 1985, IEEE Computer Society, pp. 1–14.
*IEEE Standard for Radix–Independent Floating–Point Arithmetic*, 1987, IEEE Computer Society, pp. 1–14.
"International Electrotechnical Commission," pp. 1–17 (CD 1966 2.1 © IEC: 1998).
"sRGB Gamma Calculation," 1 page (prior to Feb. 9, 2001).
Starkweather, "Colorspace Interchange Using sRGB," 6 pages (prior to Feb. 9, 2001).
Larson and Shakespeare, "Rendering with Radiance: The Art and Science of Lighting Visualization," *Morgan Kaufmann Publishers*, San Francisco, CA, pp. 292–299.

* cited by examiner

*Primary Examiner*—Sumati Lefkowitz
*Assistant Examiner*—Chante Harrison
(74) *Attorney, Agent, or Firm*—Klarquist Sparkman, LLP

(57) ABSTRACT

An imaging or other sensory reproduction system efficiently converts image or other sensory data between a perceptual color space (e.g., the sRGB color space) and a physical color space (unity gamma) or other perceptual/physical sensory models that are related by an expression involving a computationally expensive exponential function. The imaging system calculates exponential functions that can be composed from computationally inexpensive operations, such as square root, square, reciprocal, as well as multiplications and/or additions and subtractions. These computationally less expensive functions are then combined, such as in a weighted and/or offset mean, summation or difference to approximate the computationally expensive exponential function. The imaging system evaluates the expression using the approximation to efficiently yield the converted image data. The efficient conversion between perceptual and physical color spaces allows operations, such as blending and anti-aliasing, to be performed in the physical color space before display of a perceptual color space image.

15 Claims, 9 Drawing Sheets

FIG. 2

```
extern "C" void
sRGBColor( Color *pOut, Color *pIn )
{
    for ( int i = 0; i < 4; i++)
    {
        float x = (*pIn)[i];
        if ( x < 0.03928f )
            x = x/12.92f;
        else
            x = powf(((x + 0.055f)/1.055f), 2.4f);
        (*pOut)[i] = x;
    }
}
```

```
extern "C" void
LinearTosRGBColor( Color *pOut, Color *pIn )
{
    // coarse approximation: weighted arithmetic mean between
    // x^0.5 and x^0.375 approximates x^(1/2.4)
    for ( int i = 0; i < 4; i++)
    {
        float x = (*pIn)[i];
        float sqrtx = sqrtf(x);
        float sqrt3x = sqrtf(sqrtf(sqrtx));
        float pow124 = 0.38f*sqrtx+0.62f*sqrtx/sqrt3x;
        if ( x < 0.00304f )
            x = 12.92f * x;
        else
            x = 1.055f*pow124-0.055f;
        (*pOut)[i] = x;
    }
}
```

```
extern "C" void
LinearTosRGBColor( Color *pOut, Color *pIn )
{
    // finer approximation that avoids taking 3 successive
    // square roots: apply one round of N-R to guess cube
    // root of x*sqrt(sqrt(x))
    for ( int i = 0; i < 4; i++)
    {
        float x = (*pIn)[i];

float sqrtx = sqrtf(x);
        float sqrt2x = sqrtf(sqrtx);
        float appx = 0.78f*sqrtx+0.22f*sqrt2x;
        float num = x*sqrt2x;
        float cuberoot = (2*appx+(x*sqrt2x)/(appx*appx))/3.0f - 0.00025f;
        if ( x < 0.00304f )
            x = 12.92f * x;
        else
            x = 1.055f*cuberoot-0.055f;
        (*pOut)[i] = x;
    }
}
```

```
const __declspec(align(16)) __m128 Const039 = _mm_set1_ps( 0.03928f );
const __declspec(align(16)) __m128 ConstInv1292 = _mm_set1_ps( 1.0f/12.92f );
const __declspec(align(16)) __m128 Const055 = _mm_set1_ps( 0.055f );
const __declspec(align(16)) __m128 ConstInv1055 = _mm_set1_ps( 1.0f/1.055f );

const __declspec(align(16)) __m128 Const1285 = _mm_set1_ps( 1.285f );
const __declspec(align(16)) __m128 Const0285 = _mm_set1_ps( 0.285f );
```

FIG. 6

```
extern "C" void
sRGBColor( Color *pOut, Color *pIn )
{
    // SIMD: compute BOTH answers and compose output using mask
    __m128 ansBelowDelta = _mm_mul_ps( *(__m128 *) pIn, ConstInv1292 );
    __m128 x = _mm_mul_ps( ConstInv1055, _mm_add_ps( *(__m128 *) pIn, Const055 ) );
    __m128 sqrx = _mm_mul_ps( x, x );
    __m128 invsqrx = _mm_rcp_ps( sqrx );
    __m128 invsqrtx = _mm_rsqrt_ps( x );
    __m128 ansAboveDelta = _mm_div_ps( Const1285,
              _mm_mul_ps( invsqrx, _mm_add_ps( Const0285, invsqrtx ) ) );
    __m128 TrueIfLTDelta = _mm_cmplt_ps( *(__m128 *) pIn, Const039 );
    *(__m128 *) pOut = _mm_or_ps( _mm_and_ps( TrueIfLTDelta, ansBelowDelta ),
                      _mm_andnot_ps( TrueIfLTDelta, ansAboveDelta ) );
}
```

```
const __declspec(align(16)) __m128 CONST00304 = _mm_set1_ps( 0.00304f );
const __declspec(align(16)) __m128 CONST1292  = _mm_set1_ps( 12.92f );
const __declspec(align(16)) __m128 CONST055   = _mm_set1_ps( 0.055f );
const __declspec(align(16)) __m128 CONST1055  = _mm_set1_ps( 1.055f );

const __declspec(align(16)) __m128 CONST078   = _mm_set1_ps( 0.78f );
const __declspec(align(16)) __m128 CONST1m078 = _mm_set1_ps( 1.0f-0.78f );

const __declspec(align(16)) __m128 CONST38    = _mm_set1_ps( 0.38f );
const __declspec(align(16)) __m128 CONST1m38  = _mm_set1_ps( 1.0f-0.38f );

extern "C" void
LinearTosRGBColor( Color *pOut, Color *pIn )
{
    __m128 ansBelowDelta = _mm_mul_ps( *(__m128 *) pIn, CONST1292 );
    __m128 sqrtx = _mm_sqrt_ps( *(__m128 *) pIn );
    __m128 sqrt3x = _mm_sqrt_ps( _mm_sqrt_ps( sqrtx ) );
    __m128 pow124 = _mm_add_ps( _mm_mul_ps( CONST38, sqrtx ),
                _mm_div_ps( _mm_mul_ps( CONST1m38, sqrtx ), sqrt3x ) );
    __m128 ansAboveDelta = _mm_sub_ps( _mm_mul_ps( CONST1055, pow124 ), CONST055 );
    __m128 TrueIfLTDelta = _mm_cmplt_ps( *(__m128 *) pIn, CONST00304 );
    *(__m128 *) pOut = _mm_or_ps( _mm_and_ps( TrueIfLTDelta, ansBelowDelta ),
                _mm_andnot_ps( TrueIfLTDelta, ansAboveDelta ) );
}
```

FIG. 8

```c
const __declspec(align(16)) __m128 MagicO0304 = _mm_set1_ps( 0.00304f );
const __declspec(align(16)) __m128 Magic1292 = _mm_set1_ps( 12.92f );
const __declspec(align(16)) __m128 Magic055  = _mm_set1_ps( 0.055f );
const __declspec(align(16)) __m128 Magic1055 = _mm_set1_ps( 1.055f );
const __declspec(align(16)) __m128 MagicInv3 = _mm_set1_ps( 1.0f/3.0f );
const __declspec(align(16)) __m128 MagicFudge = _mm_set1_ps( 0.00025f );

const __declspec(align(16)) __m128 Magic078 = _mm_set1_ps( 0.78f );
const __declspec(align(16)) __m128 Magic1m078 = _mm_set1_ps( 1.0f-0.78f );

const __declspec(align(16)) __m128 Magic38 = _mm_set1_ps( 0.38f );
const __declspec(align(16)) __m128 Magic1m38 = _mm_set1_ps( 1.0f-0.38f );

extern "C" void
LinearTosRGBColor( Color *pOut, Color *pIn )
{
    __m128 ansBelowDelta = _mm_mul_ps( *(__m128 *) pIn, Magic1292 );
    __m128 sqrtx = _mm_sqrt_ps( *(__m128 *) pIn );
    __m128 sqrt2x = _mm_sqrt_ps( sqrtx );
    __m128 appx = _mm_add_ps( _mm_mul_ps( Magic078, sqrtx ),
                _mm_mul_ps( Magic1m078, sqrt2x ) );
    __m128 cuberoot = _mm_sub_ps(
            _mm_mul_ps( MagicInv3,
                _mm_add_ps( _mm_add_ps( appx, appx ),
                    _mm_div_ps( _mm_mul_ps( *(__m128 *) pIn, sqrt2x ),
                        _mm_mul_ps( appx, appx )
                    )
                )
            ), MagicFudge
        );
    __m128 ansAboveDelta = _mm_sub_ps( _mm_mul_ps( Magic1055, cuberoot ), Magic055 );
    __m128 TrueIfLTDelta = _mm_cmplt_ps( *(__m128 *) pIn, MagicO0304 );
    *(__m128 *) pOut = _mm_or_ps( _mm_and_ps( TrueIfLTDelta, ansBelowDelta ),
                _mm_andnot_ps( TrueIfLTDelta, ansAboveDelta ) );
}
```

EFFICIENT PERCEPTUAL/PHYSICAL COLOR SPACE CONVERSION

This application is a continuation-in-part of U.S. patent application Ser. No. 09/702,146, filed Oct. 30, 2000, entitled, "SRGB Conversion," now abandoned.

TECHNICAL FIELD

This invention relates to color representation in color imaging systems, and more particularly relates to efficiently converting between representations in perceptual and physical color spaces.

BACKGROUND AND SUMMARY

Color in color imaging systems generally is represented as vector coordinates in a three dimensional "color space." Common examples include the well-known RGB, YIQ and YUV color spaces. The RGB color space specifies a color using coordinates that represent intensities of red, green and blue light, respectively (also known as "tristimulus" values). The RGB color space is well suited for output devices such as CRT (cathode ray tube) computer monitors, which produce color by exciting red, green and blue phosphors with an electron beam at varying intensity.

A default, standard RGB color space (termed the "sRGB" color space) has been defined to support the unambiguous interchange of color image data between devices with differing color reproduction characteristics (e.g., between scanners, displays, printers, cameras and other imaging devices, which may have different gamut, as well as red, green and blue color reproduction chromaticities and luminance). (See, International Electrotechnical Commission, "Colour Measurement And Management In Multimedia Systems And Equipment," IEC61966-2-1 (1998).)

The sRGB color space is a perceptual color representation, which represents the appearance to a viewer of color on a reference monitor under reference viewing conditions. The coordinates in the sRGB color space have a non-linear relationship to actual luminance in the three respective chromaticities that closely fits a simple power function of exponent 2.2. (This exponent is sometimes referred to as the color space's "gamma" or $\gamma$). This perceptual color space is advantageous in that it closely matches the native color space of many devices (e.g., displays, scanners and digital cameras). For example, common CRT displays have a non-linear relationship of electron-gun voltage to phosphor luminance also fitting an exponential function.

It has been shown, however, that perceptual color spaces are not ideally suitable for many standard image-processing operations, such as filtering, anti-aliasing and blending. For best results, these image processing operations ideally should be performed using a physical color representation having a linear relationship to light intensity (i.e., $\gamma=1$). (See, e.g., Ward Larson, Greg and Rob Shakespeare, *Rendering with Radiance*, Morgan-Kauffman (1998).) An example of a physical color space is the scRGB color space, described in IEC 61966-2-2.

As per the sRGB standard, the conversion between the perceptual sRGB color space and a physical color space is defined using the following equations. (The sRGB color values are integer numbers in the range 0 to 255, whereas physical color values are floating point numbers in the range 0 to 1.)

$$R'_{sRGB} = R_{8bit} \div 255.0 \quad (1)$$
$$G'_{sRGB} = G_{8bit} \div 255.0$$
$$B'_{sRGB} = B_{8bit} \div 255.0$$

$$R_{sRGB} = \begin{cases} R'_{sRGB} \div 12.92 & \text{if } R'_{sRGB} \leq 0.03928 \\ [(R'_{sRGB} + 0.055)/1.055]^{2.4} & \text{otherwise} \end{cases} \quad (2)$$

$$G_{sRGB} = \begin{cases} G'_{sRGB} \div 12.92 & \text{if } G'_{sRGB} \leq 0.03928 \\ [(G'_{sRGB} + 0.055)/1.055]^{2.4} & \text{otherwise} \end{cases}$$

$$B_{sRGB} = \begin{cases} B'_{sRGB} \div 12.92 & \text{if } B'_{sRGB} \leq 0.03928 \\ [(B'_{sRGB} + 0.055)/1.055]^{2.4} & \text{otherwise} \end{cases}$$

The inverse transform (i.e., physical color space to sRGB color space) is as follows.

$$R'_{sRGB} = \begin{cases} 12.92 \times R_{sRGB} & \text{if } R_{sRGB} \leq 0.00304 \\ 1.055 \times R_{sRGB}^{(1.0/2.4)} - 0.055 & \text{otherwise} \end{cases} \quad (3)$$

$$G'_{sRGB} = \begin{cases} 12.92 \times G_{sRGB} & \text{if } G_{sRGB} \leq 0.00304 \\ 1.055 \times G_{sRGB}^{(1.0/2.4)} - 0.055 & \text{otherwise} \end{cases}$$

$$B'_{sRGB} = \begin{cases} 12.92 \times B_{sRGB} & \text{if } B_{sRGB} \leq 0.00304 \\ 1.055 \times B_{sRGB}^{(1.0/2.4)} - 0.055 & \text{otherwise} \end{cases}$$

$$R_{8bit} = 255.0 \times R'_{sRGB} \quad (4)$$
$$G_{8bit} = 255.0 \times G'_{sRGB}$$
$$B_{8bit} = 255.0 \times B'_{sRGB}$$

As can be seen from the above equations, these conversions involve calculating power functions with the exponent, 2.4. The calculation of such a power function using a floating-point instruction on conventional microprocessors consumes a relatively long time to compute. Further, given constraints on cache memory during image processing, an implementation of the conversion as a large look-up table also would be slow. Consequently, it becomes impractical to perform the perceptual-to-physical color space conversion for anti-aliasing and like image processing, and the reverse physical-to-perceptual color space conversion during real-time image renderings with such implementations.

A like problem arises with other perceptual color spaces that also ideally would be converted to physical color space representations for some image processing operations. For example, a CRT monitor that has $\gamma=2.5$ relationship of electron gun voltage to phosphor luminance would ideally convert images between representations using a device-specific RGB color space (with $\gamma=2.5$) and a physical color space ($\gamma=1$) for blending and anti-aliasing image processing operations.

The present invention provides efficient conversion between perceptual ($\gamma \neq 1$) and physical ($\gamma=1$) color spaces, and like applications involving difficult to calculate exponents. In accordance with the invention, a conversion involving a computationally expensive power function(s) of a variable is implemented by mathematically combining the results of any number of computationally less expensive functions of the variable. Such computationally less expensive functions generally are functions that can be composed of a small number of square roots, reciprocal square roots, reciprocals, multiplications and/or additions and subtractions. The combination of computationally less expensive functions can be an arithmetic mean, harmonic mean, weighted sum or difference, or other mathematical combination of the functions.

In accordance with one aspect of the invention, the computationally less expensive functions are composed of a small number of single instruction multiple data floating-point (SIMD FP) instruction set operations. Such SIMD FP operations on modern processors allow software to use single instructions to perform a same floating-point operation on packed operands, such as a range of multiple consecutive color values in an image.

In accordance with one embodiment of the invention for sRGB/physical color space conversions for example, the power function of exponent 2.4 (i.e., $x^{2.4}$) in the sRGB to physical color space conversion is approximated utilizing the following weighted harmonic mean:

$$x^{2.4} \approx \frac{1.285}{(0.285 + x^{-0.5})x^{-2}}$$

The expressions $x^{-2}$ and $x^{-0.5}$ can be computed quickly with two and one SIMD FP instructions, respectively. Specifically, $x^{-2}$ is the square of the reciprocal, and $x^{-0.5}$ is the reciprocal square root.

On the other hand, the inverse power $x^{1/2.4}$ in the inverse physical-to-sRGB conversion can be approximated with a weighted arithmetic mean of the two functions $x^{0.5}$ and $x^{0.375}$, both of which are computationally inexpensive on a processor where the square root is computationally inexpensive. The function $x^{0.375}$ can be evaluated as three successive square roots.

Alternatively, the function $x^{1/2.4}$ can be evaluated using a Newton-Raphson iteration for the cube root $$\left(x^{1/2.4} = \sqrt[3]{x^{1.25}}\right).$$

More generally, alternative embodiments of the invention for perceptual/physical color space conversion approximate a conversion involving a power function with exponents in the range between 1.7 and 2.5 (e.g., the sRGB power function $x^{2.4}$) as a combination of one or more of the computationally less expensive functions. Examples of such computationally less expensive functions include power functions with exponents in the range between 1 and 3 composed from square, square root and reciprocal operations, such as the following:

$$x^{1.25} = x\sqrt{\sqrt{x}}$$

$$x^{1.5} = x\sqrt{x}$$

$$x^{1.75} = x \cdot \frac{x}{\sqrt{\sqrt{x}}}$$

$$x^2 = x \cdot x$$

$$x^{2.25} = x \cdot x\sqrt{\sqrt{x}}$$

$$x^{2.3125} = x \cdot x\sqrt{\sqrt{x}} \cdot \sqrt{\sqrt{\sqrt{x}}}$$

$$x^{2.5} = x \cdot x \cdot \sqrt{x}$$

For the conversion from physical back to sRGB or other perceptual color space, the alternative embodiments approximate the inverse power function $x^{-1/2.4}$ (or other power function with exponent in the range of $-1/1.8$ and $-1/2.5$) as a combination of one or more inverse power functions in a similar range. Some examples include:

$$x^{0.25} = \sqrt{\sqrt{x}}$$

$$x^{0.375} = \frac{\sqrt{x}}{\sqrt{\sqrt{\sqrt{x}}}}$$

$$x^{0.5} = \sqrt{x}$$

Additionally, the invention can be applied to efficiently approximate computationally expensive power functions in other perceptual/physical conversion applications in addition to imaging, such as perceptual/physical conversion of audio and touch data. Further, the efficient approximation of power functions according to the invention can be employed in applications other than those involving perceptual/physical data conversions that require evaluation of computationally expensive power functions.

Additional features and advantages will be made apparent from the following detailed description of the illustrated embodiment, which proceeds with reference to the accompanying drawings.

BRIEF DESCRIPTION OF THE DRAWINGS

FIG. 2 is a C program listing of a conversion method from a perceptual (sRGB) color space to a physical color space in the imaging system of FIG. 1.

FIG. 3 is a C program listing of a conversion method from a physical color space to a perceptual (sRGB) color space in the imaging system of FIG. 1.

FIG. 4 is a C program listing of an alternative conversion method from a physical color space to a perceptual (sRGB) color space in the imaging system of FIG. 1.

FIGS. 5 and 6 are a C program listing of a conversion method using SIMD FP instructions from a perceptual (sRGB) color space to a physical color space in the imaging system of FIG. 1.

FIG. 7 is a C program listing of a conversion method using SIMD FP instructions from a physical color space to a perceptual (sRGB) color space in the imaging system of FIG. 1.

FIG. 8 is a C program listing of an alternative conversion method using SIMD FP instructions from a physical color space to a perceptual (sRGB) color space in the imaging system of FIG. 1.

DETAILED DESCRIPTION

Figure 1:
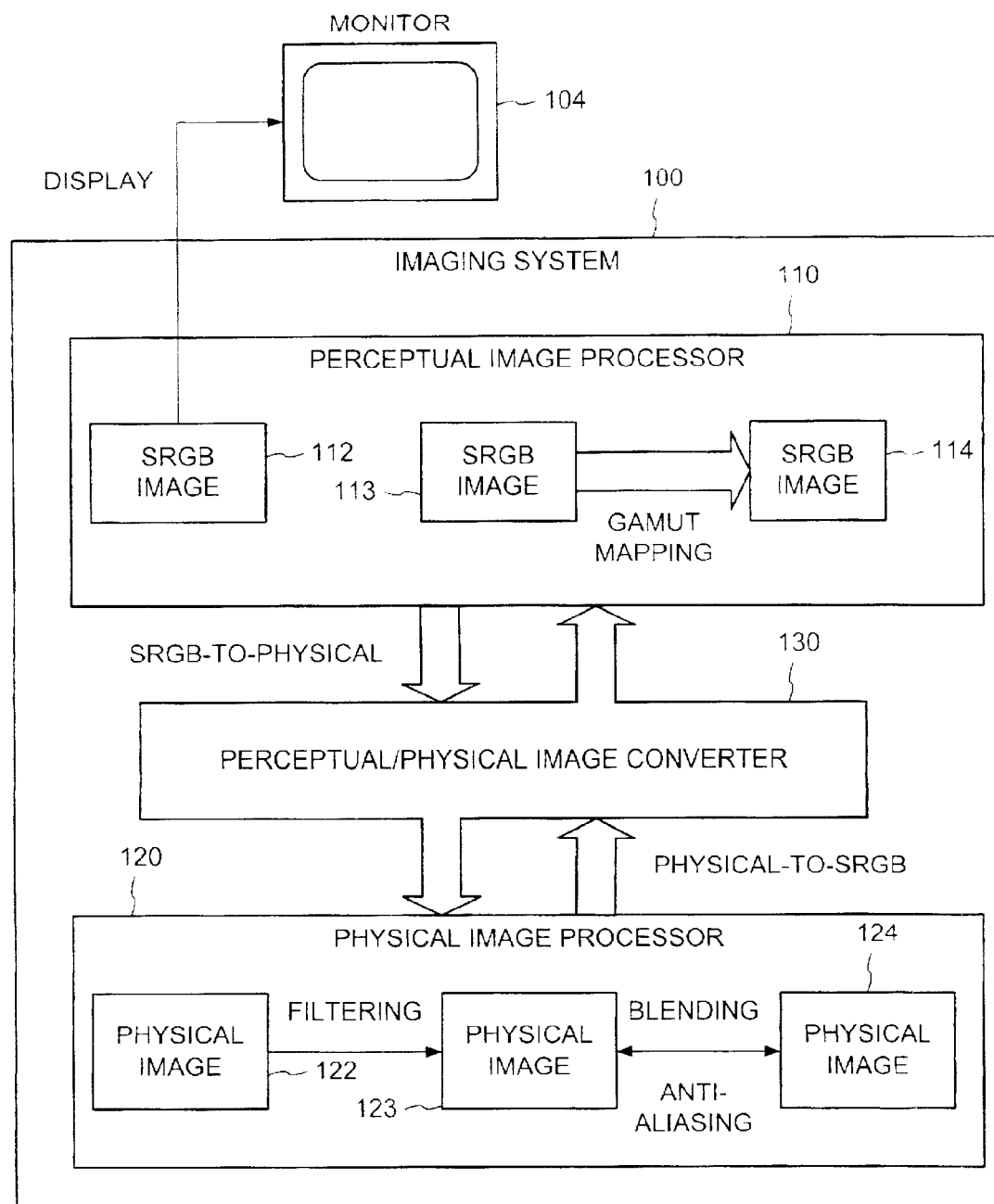
FIG. 1 is a block diagram of an imaging system that implements efficient perceptual/physical color space conversion according to an illustrated embodiment of the invention so as to permit image processing of an image in the physical color space.

With reference to FIG. 1, one implementation of efficient perceptual/physical color space conversion according to the invention is embodied in an imaging sub-system 100 in a personal computer operating system (e.g., the Graphics Display Interface (GDI) of the Microsoft Windows operating system). This imaging sub-system 100 serves to display graphics images that form part of the operating system's user interface, as well as displays for applications run on the operating system platform, on the computer's monitor 104. In other embodiments, the efficient perceptual/physical color space conversion can be implemented in other imaging systems, such as may form part of application software, operating system, firmware or hardware whether on a personal computer, computer workstation, server computer, laptop, handheld computer, computer peripheral device, audio-video equipment, scanner, printer, camera, television, set-top box, game console, or other device that performs image processing.

The imaging system 100 includes a perceptual image processor 110 and a physical image processor 120. The perceptual image processor 110 performs processing on image data (e.g., sRGB images 112–114) represented using a perceptual color space. The perceptual color space has a non-linear relationship of color value to light intensity or non-unity gamma ($\gamma \neq 1$). The perceptual color space used in the perceptual image processor 110 of the illustrated imaging system 100 is the sRGB color space. Alternatively, other perceptual color spaces can be used, such as a device-specific RGB color space having a gamma corresponding to the relationship of electron gun voltage to light intensity of the respective monitor 104. The perceptual color space in alternative implementations also can be a color space using other than red, green and blue coordinates. The perceptual image processor 110 provides image processing operations that are best performed in the perceptual color space, such as rendering or displaying the image to the computer monitor 104 and gamut mapping.

The physical image processor 120 in the illustrated imaging system 100 performs image processing operations that are more ideally performed on image data represented in a physical color space (e.g., physical images 122–124). The physical color space has a linear relationship of color value to light intensity. In the illustrated imaging system 100, the physical color space is a 32-bit RGB color space with unity gamma ($\gamma=1$), i.e., each of the red, green and blue coordinates is represented as a 32-bit floating point value in the range 0 to 1.0 directly relating to the light intensity of that color. Alternatively, other pixel representations, such as fixed point integer values, and physical color spaces, including non-RGB color spaces, can be used. The image processing operations performed in the physical image processor 120 can include, for example, filtering, blending and anti-aliasing operations.

The illustrated imaging system 100 also includes a perceptual/physical image converter 130 that implements efficient perceptual/physical color space conversion between the sRGB images 112–114 and the physical color space images 122–124. Typically, the images processed in the illustrated imaging system 100 are originally represented in the sRGB color space, because the sRGB images originate from other devices (e.g., an image capturing device, such as a scanner or camera) and the sRGB color space is used as the color interchange standard between that device and the imaging system. Further, the images typically are displayed directly from their representation in the sRGB color space by the perceptual image processor 110 in the illustrated imaging system 100. In between, the images typically are subjected to the various image processing operations that are more ideally performed by the physical image processor 120 while in their physical color space representation. Consequently, the speed of converting the images between perceptual and physical color space representations for processing operations in the respective perceptual and physical image processors 110, 120 affects the performance of the imaging system 100, particularly for real-time imaging applications (e.g., video, animations, etc.).

As discussed in the background above, the conversion from the sRGB color to the 32-bit RGB color space, and back again involves a power function with exponent of 2.4, which on conventional computer processors is computationally expensive to solve using a floating point power function instruction. The efficient perceptual/physical image conversion performed in the converter 130 approximates this computationally expensive exponential function in the perceptual/physical conversion by mathematically combining the results of a number of computationally less expensive functions of the color value.

More particularly, the converter 130 approximates the function $x^{2.4}$ in the sRGB to physical color space conversion (equation 2 listed in the background above) utilizing a weighted harmonic mean involving square, square root and reciprocal functions, as follows:

$$x^{2.4} \approx \frac{1.285}{(0.285 + x^{-0.5})x^{-2}}$$

This expression can be evaluated using computationally relatively inexpensive floating-point operations. In comparison to the computational expense of evaluating the function $x^{2.4}$ using a floating point instruction set, this expression can be evaluated as a combination of floating point instructions for square, square root, reciprocal, addition, subtraction, and multiplication operations that is less computationally expensive on a conventional processor. The weighting factor used in this weighted harmonic mean expression yields an absolute error of 1/1012 within the allowed range of sRGB color values.

FIG. 2 illustrates a C program listing 200 of a procedure that implements the just-described efficient sRGB to physical color space conversion.

For the physical to sRGB conversion, the converter 130 approximates the inverse power function $x^{1/2.4}$ utilizing a weighted arithmetic mean of the functions $x^{0.5}$ and $x^{0.375}$, which also can be evaluated using square, square root and reciprocal floating point instruction operations. In a first alternative, the following weighted arithmetic mean expression is used:

$$x^{1/2.4} \approx wx^{0.5}+(1-w)x^{0.375}$$

where the function $x^{0.375}$ is evaluated using the following expression:

$$x^{0.375} = \frac{\sqrt{x}}{\sqrt{\sqrt{\sqrt{x}}}}$$

With the weighting factor (w) in this expression equal to 0.362916, the expression yields a worst-case absolute error of about 1/770 over the range $0 \leq x \leq 1$.

FIG. 3 illustrates a C program listing 300 of a procedure to evaluate this first alternative of the efficient physical to sRGB color space conversion.

The first alternative expression for the sRGB conversion uses three successive square root floating point operations, which can introduce latency in the conversion. A second alternative expression eliminates the successive square root operations to reduce latency by combining a Newton-Raphson iteration for evaluating the cube root together with the observation that $x^{1/2.4}=\sqrt[3]{\sqrt{x^{1.25}}}$. A weighted arithmetic mean of $x^{0.5}$ and $x^{0.25}$ (which computed as two square roots) generates an estimate for input to the Newton-Raphson iteration. This produces the following expression approximating the function $x^{1/2.4}$:

$$y' = 0.78x^{0.5} + 0.22x^{0.25}$$

$$x^{1/2.4} \approx \frac{1}{3}\left(2y' + \frac{2x^{1.25}}{y'^2}\right) - 0.00025$$

The subtraction of 0.00025 in the above expression yields a more precise approximation because the preceding terms err slightly on the positive.

FIG. 4 illustrates a C program listing 310 of a procedure to evaluate this second alternative of the efficient physical to sRGB color space conversion.

The above-described expressions yield accurate approximations of the functions $x^{2.4}$ and $x^{1/2.4}$ using arithmetic combinations of computationally inexpensive square, square root and reciprocal operations. In alternative implementations of the perceptual/physical image converter 130, these functions can be approximated using arithmetic combinations of other computationally inexpensive functions. Such computationally less expensive functions generally are functions that can be composed of a small number of square roots, reciprocal square roots, reciprocals, multiplications and/or additions and subtractions. The combination of these computationally less expensive functions can be an arithmetic mean, harmonic mean, weighted sum or difference, or other mathematical combination of the functions.

For approximating the power function $x^{2.4}$ in the sRGB/physical color space conversion (as well as other perceptual/physical color space conversions involving a power function with exponent in the range between 1.7 and 2.5), suitable computationally less expensive functions are generally other power functions in a similar range (e.g., 1.7 to 2.5), which can be composed as a product of one or more square, square root, reciprocal operations. Examples of suitable computationally less expensive functions in this range include the following:

$$x^{1.25} = x\sqrt{\sqrt{x}}$$

$$x^{1.5} = x\sqrt{x}$$

$$x^{1.75} = \frac{x \cdot x}{\sqrt{\sqrt{x}}}$$

$$x^2 = x \cdot x$$

$$x^{2.25} = x \cdot x\sqrt{\sqrt{x}}$$

$$x^{2.3125} = x \cdot x\sqrt{\sqrt{x}} \cdot \sqrt{\sqrt{\sqrt{x}}}$$

$$x^{2.5} = x \cdot x \cdot \sqrt{x}$$

For the conversion from physical back to sRGB (or other perceptual) color space, suitable functions that can be combined to approximate the inverse power function $x^{-1/2.4}$ (or other inverse power function in the range $-1/1.7$ to $-1/2.5$) are inverse power functions in a similar range. Some examples include:

$$x^{0.25} = \sqrt{\sqrt{x}}$$

$$x^{0.375} = \frac{\sqrt{x}}{\sqrt{\sqrt{\sqrt{x}}}}$$

-continued $$x^{0.5} = \sqrt{x}$$

In alternative embodiments of the invention, the imaging system 100 can perform efficient conversion between perceptual and physical color spaces other than sRGB and 8-bit RGB color spaces. For example, the perceptual color space can be a device-specific RGB color space, such as a color space of a CRT monitor, which typically have a gamma in the range of 1.7 to 2.5. In such cases, the perceptual color space may have a gamma differing from that of sRGB, and thus the conversion involves approximating a computationally expensive power function other than $X^{2.4}$. The efficient conversion in this alternative imaging system approximates the computationally expensive power function as an expression combining computationally less expensive floating point operations. Again, the computationally expensive floating point operations used in the alternative imaging system can be composed of a small number of square roots, reciprocal square roots, reciprocals, multiplications and/or additions and subtractions. The combination of these computationally less expensive functions can be an arithmetic mean, harmonic mean, weighted sum or difference, or other mathematical combination of the functions.

In alternative embodiments of the invention, the imaging system 100 also can perform conversions between perceptual color spaces and other physical color spaces, including as another example the scRGB physical color space described in scRGB, IEC 61966-2-2.

Further, although the target physical color space generally has a unity gamma ($\gamma=1$), the perceptual to physical color space conversion may leave a range or ranges of color values in the physical color space to have a non-unity gamma. For example, the conversion to physical color space can convert color values that are within the range of visible or displayable range of color values (e.g., color values between 0.0 and 1.0 in the illustrated color space) to have unity gamma, while leaving under- and over-range color values (e.g., color values less than black or 0.0 and above white or 1.0 in the illustrated color space) un-altered. The resulting physical color space has a unity gamma within one range (e.g., color values of 0.0 to 1.0), and a non-unity gamma outside of that range. In other alternative embodiments, the converted color values can be limited to the maximum or minimum of the color space (e.g., 0.0 and 1.0). With reference now to FIGS. 5–8, the efficient perceptual/physical image conversion utilizing the above-described expressions to approximate the power functions $x^{2.4}$ and $x^{1/2.4}$ is well adapted for implementation on modern microprocessors using a single instruction, multiple data (SIMD) floating point (FP) instruction set, such as the 3DNow instructions of some current AMD microprocessors and the SSE1 instructions of some Intel microprocessors. The SIMD FP instruction sets allow a software program to use single instructions to perform multiple floating point operations on packed operands. A C program listing 400–401 shown in FIGS. 5 and 6 implements the efficient sRGB-to-physical conversion discussed above using SIMD FP instructions. A C program listing 500 shown in FIG. 7 implements the efficient physical-to-sRGB conversion using the first alternative expression discussed above with SIMD FP instructions. Finally, a C program listing 510 shown in FIG. 8 implements the efficient physical-to-sRGB conversion using the second alternative expression discussed above with SIMD FP instructions.

The C code in FIGS. 5–8 uses special data types and intrinsic functions to access the Intel SSE1 instruction set.

The\_m128 data type is a 128-bit word that contains four packed 32-bit floating point values. Intrinsic functions that operate on this data type evaluate to SSE1 instructions that use the SSE1 registers and instructions. For example, calling the function\_mm\_mul\_ps causes the compiler to generate a MULPS instruction, which performs four multiplications on corresponding floating point values in the two 128-bit operands. Similar code may be developed using other languages or development technologies such as assemblers, and may target other instruction sets such as 3DNow or similar instruction sets on non-x86 compatible microprocessors.

Figure 9:
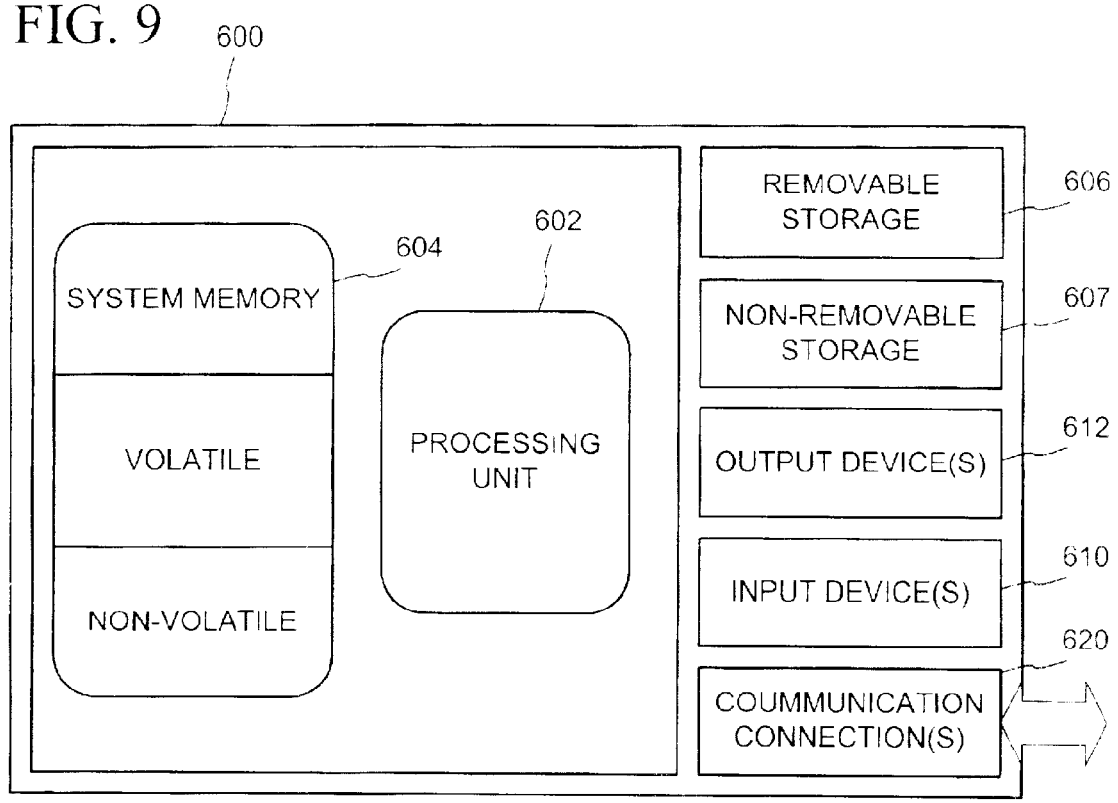
FIG. 9 is a block diagram of a computer system employing the imaging system of FIG. 1.

With reference to FIG. 9, an exemplary computer 600 that incorporates the illustrated imaging system 100 (FIG. 1) typically is configured to include a processing unit 602 (e.g., a microprocessor or micro-controller) and system memory 604. In some embodiments, the processor is a microprocessor providing a SIMD FP instruction set, such as the AMD 3DNow instructions or the Intel SSE1 instructions. Depending on the exact configuration and type of computing device, the system memory may be volatile (such as RAM), non-volatile (such as ROM, flash memory, etc.) or some combination of the two. Additionally, the computer 600 may also have mass or secondary storage (removable 606 and/or non-removable 607) such as magnetic or optical disks or tape. Similarly, the computer 600 may also have input devices 610 such as a keyboard, pointing device, microphone, etc., and/or output devices 612 such as display, speaker, printer, force-feedback, etc. The computer 600 also typically includes network connections 620 to other devices, computers, networks, servers, etc. using either wired or wireless media. Alternatively, the system components of a computer may in fact be embodied in a distributed computing system. For example, a terminal device may incorporate input and output devices to present only the user interface, whereas a processing component of the system are resident elsewhere. A phone may present web pages that are constructed on a remote server from data resident on a database server somewhere else again.

The exemplary computer 600 typically include at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The exemplary computer 600 incorporating the illustrated imaging system 100 can be a personal computer, computer workstation, server computer, laptop, handheld computer. Alternatively, the exemplary computer 600 incorporating the illustrated imaging system 100 can be a device with embedded computing capability, such as a computer peripheral device, audio-video equipment, scanner, printer, camera, television, set-top box, game console, vehicle navigation system, among others.

The invention also has application outside of color space conversion of images in other applications where rapid evaluation of a computationally expensive power function is required. These other applications can include perceptual/physical conversion of audio, touch and other sensory data. In an alternative embodiment of the invention for such other applications, the computationally expensive power function is approximated by evaluating an expression mathematically combining computationally less expensive floating point operations. The computationally expensive floating point operations can be composed of a small number of square roots, reciprocal square roots, reciprocals, multiplications and/or additions and subtractions. The combination of these computationally less expensive functions can be an arithmetic mean, harmonic mean, weighted sum or difference, or other mathematical combination of the functions. In the alternative embodiment, an evaluator implementing the power function approximating expression is incorporated into a software system or subsystem (e.g., an audio system, touch/force-feedback system, etc.) that performs the other application.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. On a sensory reproduction system having a processor with an instruction set including at least a computationally expensive floating point power function and a set of computationally less expensive floating point operations, a method of using said processor for efficiently converting sensory data between a perceptual data representation and a physical data representation, where the perceptual data representation is related to the physical data representation by an expression involving a power function, the method comprising:

performing a plurality of the computationally less expensive floating point operations on an item of the sensory data;

combining results of the plural performed operations to yield an approximation of a result of the power function on the sensory data item, wherein the combining results of the plural performed operations comprises performing a weighted mathematical combination of the results, where the weighted mathematical combination is from a group comprising a mean, sum and difference;

evaluating the expression using the approximation to provide a converted sensory data item; and reproducing a physical sensation based on the perceptual data representation, wherein the combining results of the plural performed operations comprises performing a mathematical combination of the results, where the mathematical combination is from a group comprising arithmetic mean, harmonic mean, weighted sum and weighted difference.

2. The method of claim 1 wherein the computationally less expensive floating point operations are from a group comprising addition, subtraction, multiplication, square root, reciprocal square root, and reciprocal floating point operations.

3. The method of claim 1 where the instruction set includes at least single instruction, multiple data floating point operation instructions, the method further comprising:

executing a single instruction, multiple data floating point operation instruction to perform a first of the computationally less expensive floating point operations on multiple items of the sensory data together.

4. An imaging system comprising:

a display monitor;

a display unit operative to display an image on the display monitor, where the image is represented by perceptual image data comprising a plurality of color pixel data specifying colors in a perceptual color space, the perceptual color space having a non-unity gamma;

a physical image processor operative to perform an image processing operation on physical image data in which color pixel data specifies colors in a physical color space, the physical color space having a unity gamma within a range; and a perceptual/physical image converter operating to convert the perceptual image data to the physical image data according to a perceptual-to-physical conversion expression involving a power function so as to permit the physical image processor to perform the image processing operation prior to display, and to convert the physical image data back to the perceptual image data according to a physical-to-perceptual conversion expression involving an inverse power function after the image processing operation for display on the display monitor, the perceptual/physical image converter approximating the power function and the inverse power function as a weighted mathematical combination of plural computationally inexpensive floating point operations on items of the image data;

wherein the perceptual/physical image converter operates to convert color values of the color pixel data within the range to have the unity gamma in the perceptual color space, while leaving color values of the color pixel data outside the range unaltered.

5. The imaging system of claim 4 wherein the perceptual/physical image converter operates to approximate the power function as a weighted mean of floating point operations taken from a group comprising addition, subtraction, multiplication, square root and reciprocal operations.

6. The imaging system of claim 4 wherein the perceptual/physical image converter operates to approximate the power function as a weighted summation of floating point operations taken from a group comprising addition, subtraction, multiplication, square root and reciprocal operations.

7. The imaging system of claim 4 wherein the computationally inexpensive floating point operations comprise at least some of addition, subtraction, multiplication, square root and reciprocal operations.

8. The imaging system of claim 4 further comprising:

a computer processor having in instruction set including at least one single instruction, multiple data floating point operation instruction;

wherein the perceptual/physical image converter approximates the power function and the inverse power function by evaluating an expression combining exponential functions composed of at least one of square, square root and reciprocal operations performed using the at least one single instruction, multiple data floating point operation instruction.

9. An imaging system comprising:

a display monitor;

a display unit operative to display an image on the display monitor, where the image is represented by perceptual image data comprising a plurality of color pixel data specifying colors in a perceptual color space, the perceptual color space having a non-unity gamma;

a physical image processor operative to perform an image processing operation on physical image data in which color pixel data specifies colors in a physical color space, the physical color space having a unity gamma within a range; and a perceptual/physical image converter operating to convert the perceptual image data to the physical image data according to a perceptual-to-physical conversion expression involving a power function so as to permit the physical image processor to perform the image processing operation prior to display, and to convert the physical image data back to the perceptual image data according to a physical-to-perceptual conversion expression involving an inverse power function after the image processing operation for display on the display monitor, the perceptual/physical image converter approximating the power function and the inverse power function as a weighted mathematical combination of plural computationally inexpensive floating point operations on items of the image data;

wherein the perceptual color space has a gamma within a range of 1.7 to 2.5, and the perceptual/physical image converter approximates a computationally expensive power function with an exponent also in the range of 1.7 to 2.5 as a weighted mathematical combination of power functions in a similar range composed of addition, subtraction, multiplication, square root and reciprocal operations.

10. An imaging system comprising:

a display monitor;

a display unit operative to display an image on the display monitor, where the image is represented by perceptual image data comprising a plurality of color pixel data specifying colors in a perceptual color space, the perceptual color space having a non-unity gamma;

a physical image processor operative to perform an image processing operation on physical image data in which color pixel data specifies colors in a physical color space, the physical color space having a unity gamma within a range; and a perceptual/physical image converter operating to convert the perceptual image data to the physical image data according to a perceptual-to-physical conversion expression involving a power function so as to permit the physical image processor to perform the image processing operation prior to display, and to convert the physical image data back to the perceptual image data according to a physical-to-perceptual conversion expression involving an inverse power function after the image processing operation for display on the display monitor, the perceptual/physical image converter approximating the power function and the inverse power function as a weighted mathematical combination of plural computationally inexpensive floating point operations on items of the image data;

wherein the perceptual color space has a gamma within a range of 1.7 to 2.5, and the perceptual/physical image converter approximates a computationally expensive inverse power function with an exponent in the range of −1/1.7 to −1/2.5 as a weighted mathematical combination of power functions composed of addition, subtraction, multiplication, square root and reciprocal operations.

11. An imaging system comprising:

a display monitor;

a display unit operative to display an image on the display monitor, where the image is represented by perceptual image data comprising a plurality of color pixel data specifying colors in a perceptual color space, the perceptual color space having a non-unity gamma;

a physical image processor operative to perform an image processing operation on physical image data in which color pixel data specifies colors in a physical color space, the physical color space having a unity gamma within a range; and a perceptual/physical image converter operating to convert the perceptual image data to the physical image data according to a perceptual-to-physical conversion expression involving a power function so as to permit the physical image processor to perform the image processing operation prior to display, and to convert the physical image data back to the perceptual image data according to a physical-to-perceptual conversion expression involving an inverse power function after the image processing operation for display on the display monitor, the perceptual/physical image converter approximating the power function and the inverse power function as a weighted mathematical combination of plural computationally inexpensive floating point operations on items of the image data;

wherein the perceptual color space is the sRGB color space, and the perceptual/physical image converter approximates a power function with exponent of 2.4 as a weighted harmonic mean of the power functions $x^{-2}$ and $x^{-2.5}$ evaluated as the square of the reciprocal and the reciprocal square root, respectively.

12. The imaging system of claim 11 the perceptual/physical image converter approximates the power function with exponent of 2.4 by evaluating the expression, $$x^{2.4} \approx \frac{1.285}{(0.285 + x^{-0.5})x^{-2}}.$$

13. An imaging system comprising:

a display monitor;

a display unit operative to display an image on the display monitor, where the image is represented by perceptual image data comprising a plurality of color pixel data specifying colors in a perceptual color space, the perceptual color space having a non-unity gamma;

a physical image processor operative to perform an image processing operation on physical image data in which color pixel data specifies colors in a physical color space, the physical color space having a unity gamma within a range; and a perceptual/physical image converter operating to convert the perceptual image data to the physical image data according to a perceptual-to-physical conversion expression involving a power function so as to permit the physical image processor to perform the image processing operation prior to display, and to convert the physical image data back to the perceptual image data according to a physical-to-perceptual conversion expression involving an inverse power function after the image processing operation for display on the display monitor, the perceptual/physical image converter approximating the power function and the inverse power function as a weighted mathematical combination of plural computationally inexpensive floating point operations on items of the image data;

wherein the perceptual color space is the sRGB color space, and the perceptual/physical image converter approximates an inverse power function with exponent of −1/2.4 as a weighted arithmetic mean of the power functions $x^{0.5}$ and $x^{0.375}$.

14. The imaging system of claim 13 wherein the perceptual/physical image converter approximates the inverse power function with exponent of −1/2.4 by evaluating the expression, $$x^{1/2.4} \approx w\sqrt{x} + (1-w)\frac{\sqrt{x}}{\sqrt{\sqrt{\sqrt{x}}}},$$

where w is a weighting factor.

15. The imaging system of claim 13 wherein the perceptual/physical image converter approximates the inverse power function with exponent of −1/2.4 by evaluating the expressions, $y'=0.78x^{0.5}+0.22x^{0.25}$ and $$x^{1/2.4} \approx \frac{1}{3}\left(2y' + \frac{2x^{1.25}}{y'^2}\right) - b,$$

where b is an offset.

* * * * *

UNITED STATES PATENT AND TRADEMARK OFFICE
CERTIFICATE OF CORRECTION

| | | |
|---|---|---|
| PATENT NO. | : 6,954,214 B2 | Page 1 of 4 |
| APPLICATION NO. | : 09/780325 | |
| DATED | : October 11, 2005 | |
| INVENTOR(S) | : Wilt et al. | |

It is certified that error appears in the above-identified patent and that said Letters Patent is hereby corrected as shown below:

On the title page, item (56), in "Other Publications", in column 2, line 12,
after "229-299" insert -- (1997) --.

In the drawings:
On Sheet 4 of 9, in FIG. 4, please replace "FIG. 4" with the following figure.

FIG. 4

310 —

```
extern "C" void
LinearTosRGBColor( Color *pOut, Color *pIn )
{
    // finer approximation that avoids taking 3 successive
    // square roots: apply one round of N-R to guess cube
    // root of x*sqrt(sqrt(x))
    for ( int i = 0; i < 4; i++ )
    {
        float x = (*pIn)[i];

float sqrtx = sqrtf(x);
        float sqrt2x = sqrtf(sqrtx);
        float appx = 0.78f*sqrtx+0.22f*sqrt2x;
        float num = x*sqrt2x;
        float cuberoot = (2*appx+(x*sqrt2x)/(appx*appx))/3.0f - 0.00025f;
        if ( x < 0.00304f )
            x = 12.92f * x;
        else
            x = 1.055f*cuberoot-0.055f;
        (*pOut)[i] = x;
    }
}
```

Signed and Sealed this
Eighth Day of May, 2012

David J. Kappos
*Director of the United States Patent and Trademark Office*

CERTIFICATE OF CORRECTION (continued)
U.S. Pat. No. 6,954,214 B2

In the drawings:
On Sheet 5 of 9, in FIG. 5, please replace "FIG. 5" with the following figure.

FIG. 5

400

```
const __declspec(align(16)) __m128 Const039 = _mm_set1_ps( 0.03928f );
const __declspec(align(16)) __m128 ConstInv1292 = _mm_set1_ps( 1.0f/12.92f );
const __declspec(align(16)) __m128 Const055 = _mm_set1_ps( 0.055f );
const __declspec(align(16)) __m128 ConstInv1055 = _mm_set1_ps( 1.0f/1.055f );

const __declspec(align(16)) __m128 Const1285 = _mm_set1_ps( 1.285f );
const __declspec(align(16)) __m128 Const0285 = _mm_set1_ps( 0.285f );
```

In the drawings:
On Sheet 6 of 9, in FIG. 6, please replace "FIG. 6" with the following figure.

401

FIG. 6

```
extern "C" void
sRGBColor( Color *pOut, Color *pIn )
{
    // SIMD: compute BOTH answers and compose output using mask
    __m128 ansBelowDelta = _mm_mul_ps( *(__m128 *) pIn, ConstInv1292 );
    __m128 x = _mm_mul_ps( ConstInv1055, _mm_add_ps( *(__m128 *) pIn, Const055 ) );
    __m128 sqrx = _mm_mul_ps( x, x );
    __m128 invsqrx = _mm_rcp_ps( sqrx );
    __m128 invsqrtx = _mm_rsqrt_ps( x );
    __m128 ansAboveDelta = _mm_div_ps( Const1285,
            _mm_mul_ps( invsqrx, _mm_add_ps( Const0285, invsqrtx ) ) );
    __m128 TrueIfLTDelta = _mm_cmplt_ps( *(__m128 *) pIn, Const039 );
    *(__m128 *) pOut = _mm_or_ps( _mm_and_ps( TrueIfLTDelta, ansBelowDelta ),
            _mm_andnot_ps( TrueIfLTDelta, ansAboveDelta ) );
}
```

CERTIFICATE OF CORRECTION (continued)
U.S. Pat. No. 6,954,214 B2

In the drawings:

On Sheet 7 of 9, in FIG. 7, please replace "FIG. 7" with the following figure.

FIG. 7

```
const __declspec(align(16)) __m128 CONST00304 = _mm_set1_ps( 0.00304f );
const __declspec(align(16)) __m128 CONST1292 = _mm_set1_ps( 12.92f );
const __declspec(align(16)) __m128 CONST055 = _mm_set1_ps( 0.055f );
const __declspec(align(16)) __m128 CONST1055 = _mm_set1_ps( 1.055f );

const __declspec(align(16)) __m128 CONST078 = _mm_set1_ps( 0.78f );
const __declspec(align(16)) __m128 CONST1m078 = _mm_set1_ps( 1.0f-0.78f );

const __declspec(align(16)) __m128 CONST38 = _mm_set1_ps( 0.38f );
const __declspec(align(16)) __m128 CONST1m38 = _mm_set1_ps( 1.0f-0.38f );

extern "C" void
LinearTosRGBColor( Color *pOut, Color *pIn )
{
    __m128 ansBelowDelta = _mm_mul_ps( *(__m128 *)pIn, CONST1292 );
    __m128 sqrtx = _mm_sqrt_ps( *(__m128 *)pIn );
    __m128 sqrt3x = _mm_sqrt_ps( _mm_sqrt_ps( sqrtx ) );
    __m128 pow124 = _mm_add_ps( _mm_mul_ps( CONST38, sqrtx ),
                        _mm_div_ps( _mm_mul_ps( CONST1m38, sqrtx ), sqrt3x ) );
    __m128 ansAboveDelta = _mm_sub_ps( _mm_mul_ps( CONST1055, pow124 ), CONST055 );
    __m128 TrueIfLTDelta = _mm_cmplt_ps( *(__m128 *)pIn, CONST00304 );
    *(__m128 *) pOut = _mm_or_ps( _mm_and_ps( TrueIfLTDelta, ansBelowDelta ),
                        _mm_andnot_ps( TrueIfLTDelta, ansAboveDelta ) );
}
```

CERTIFICATE OF CORRECTION (continued)
U.S. Pat. No. 6,954,214 B2

In the drawings:

On Sheet 8 of 9, in FIG. 8, please replace "FIG. 8" with the following figure.

FIG. 8

```
500 const __declspec(align(16)) __m128 Magic00304 = _mm_set1_ps( 0.00304f );
const __declspec(align(16)) __m128 Magic1292  = _mm_set1_ps( 12.92f );
const __declspec(align(16)) __m128 Magic055   = _mm_set1_ps( 0.055f );
const __declspec(align(16)) __m128 Magic1055  = _mm_set1_ps( 1.055f );
const __declspec(align(16)) __m128 MagicInv3  = _mm_set1_ps( 1.0f/3.0f );
const __declspec(align(16)) __m128 MagicFudge = _mm_set1_ps( 0.00025f );

const __declspec(align(16)) __m128 Magic078   = _mm_set1_ps( 0.78f );
const __declspec(align(16)) __m128 Magic1m078 = _mm_set1_ps( 1.0f-0.78f );

const __declspec(align(16)) __m128 Magic38    = _mm_set1_ps( 0.38f );
const __declspec(align(16)) __m128 Magic1m38  = _mm_set1_ps( 1.0f-0.38f );

extern "C" void
LinearTosRGBColor( Color *pOut, Color *pIn )
{
    __m128 ansBelowDelta = _mm_mul_ps( *(__m128 *) pIn, Magic1292 );
    __m128 sqrtx = _mm_sqrt_ps( *(__m128 *) pIn );
    __m128 sqrt2x = _mm_sqrt_ps( sqrtx );
    __m128 appx = _mm_add_ps( _mm_mul_ps( Magic078, sqrtx ),
                              _mm_mul_ps( Magic1m078, sqrt2x ) );
    __m128 cuberoot = _mm_sub_ps(
                    _mm_mul_ps( MagicInv3,
                      _mm_add_ps( _mm_add_ps( appx, appx ),
                        _mm_div_ps( _mm_mul_ps( *(__m128 *) pIn, sqrt2x ),
                          _mm_mul_ps( appx, appx )
                        )
                      )
                    ), MagicFudge
                  );
    __m128 ansAboveDelta = _mm_sub_ps( _mm_mul_ps( Magic1055, cuberoot ), Magic055 );
    __m128 TrueIfLTDelta = _mm_cmplt_ps( *(__m128 *) pIn, Magic00304 );
    *(__m128 *) pOut = _mm_or_ps( _mm_and_ps( TrueIfLTDelta, ansBelowDelta ),
                        _mm_andnot_ps( TrueIfLTDelta, ansAboveDelta ) );
}
```

In column 3, line 5, delete "modern" and insert -- modem --, therefor.

In column 3, line 32, delete "$x^{1/24}$" and insert -- $x^{1/2.4}$ --, therefor.

In column 6, line 63, delete " $x^{1/2.4} = \sqrt[3]{x^{1.25}}$ " and insert -- $x^{1/2.4} = \sqrt[3]{x^{1.25}}$ --, therefor.

In column 6, line 64, after "which" insert -- can be --.

In column 8, line 1, delete "$x^{05}$" and insert -- $x^{0.5}$ --, therefor.

In column 8, line 40, delete "un-altered" and insert -- unaltered --, therefor.

In column 12, line 6, in Claim 8, after "having" delete "in" and insert -- an --, therefor.